United States Patent
Lachnitt et al.

(10) Patent No.: US 8,996,081 B2
(45) Date of Patent: Mar. 31, 2015

(54) INTEGRATION DEVICE AND METHOD OF MANUFACTURING A SHELL FOR A CRADLE

(71) Applicant: Peiker Acustic GmbH & Co. KG, Friedrichsdorf (DE)

(72) Inventors: Jens Lachnitt, Alsfeld (DE); Ulrich Bürg, Offenbach (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 168 days.

(21) Appl. No.: 13/865,308

(22) Filed: Apr. 18, 2013

(65) Prior Publication Data

US 2013/0295992 A1   Nov. 7, 2013

(30) Foreign Application Priority Data

Apr. 24, 2012   (DE) .......................... 10 2012 007 922

(51) Int. Cl.
| | |
|---|---|
| H04M 1/00 | (2006.01) |
| H04M 1/04 | (2006.01) |
| H01Q 1/12 | (2006.01) |
| H01Q 1/32 | (2006.01) |
| H01Q 3/24 | (2006.01) |
| H01Q 21/28 | (2006.01) |
| H04B 5/00 | (2006.01) |
| B60R 11/02 | (2006.01) |
| B60R 11/00 | (2006.01) |

(52) U.S. Cl.
CPC ............... *H04M 1/04* (2013.01); *H01Q 1/1257* (2013.01); *H01Q 1/325* (2013.01); *H01Q 3/24* (2013.01); *H01Q 21/28* (2013.01); *H04B 5/0037* (2013.01); *B60R 11/0241* (2013.01); *B60R 2011/0075* (2013.01)

USPC .................. 455/575.7; 455/575.1; 455/575.9; 455/13.3

(58) Field of Classification Search
USPC ............. 455/569.2, 575.1, 575.7, 575.9, 557, 455/347–349, 13.3
See application file for complete search history.

(56) References Cited

U.S. PATENT DOCUMENTS

| | | | |
|---|---|---|---|
| 8,860,552 B2 * | 10/2014 | Bahou | 340/10.1 |
| 2004/0204074 A1 * | 10/2004 | Desai | 455/557 |
| 2005/0007067 A1 | 1/2005 | Baarman et al. | |
| 2008/0165066 A1 | 7/2008 | Tiscareno et al. | |

FOREIGN PATENT DOCUMENTS

| | | |
|---|---|---|
| DE | 10 2008 005 589 A1 | 7/2008 |
| DE | 10 2007 044 294 A1 | 12/2008 |
| DE | 10 2010 027 620 A1 | 1/2012 |

OTHER PUBLICATIONS

Extended European Search Report dated Jul. 17, 2013.

* cited by examiner

*Primary Examiner* — Dominic E Rego
(74) *Attorney, Agent, or Firm* — Burr & Brown, PLLC (57) ABSTRACT

The invention relates to an integration device for integrating a cellular telephone in a vehicle, whereby the integration device comprises a receiving compartment, a coupler antenna for the cellular telephone network attached to the receiving compartment and electronics which can be connected to an external antenna. Here, the integration device comprises multiple coupler antennae connected to the electronics, whereby a communications connection is made via the cellular telephone network such that the electronics of the integration device for the active cellular telephone inserted in the receiving compartment, regardless of the type of the cellular telephone inserted and regardless of the position of the cellular telephone inserted in the receiving compartment, selects and uses for the communication that coupler antenna with the highest reception quality in the communication with the cellular telephone located in the receiving compartment.

10 Claims, 6 Drawing Sheets

INTEGRATION DEVICE AND METHOD OF MANUFACTURING A SHELL FOR A CRADLE

This application claims the benefit under 35 USC §119(a)-(d) of German Application No. 10 2012 007 922.2 filed Apr. 24, 2012, the entirety of which is incorporated herein by reference.

FIELD OF THE INVENTION

The invention relates to an integration device and a method for the manufacture of a shell for a cradle.

BACKGROUND OF THE INVENTION

An integration device for cellular telephones is already known from DE 10 2008 005 589 A1. These integration devices are equipped with at least one antenna for sending and receiving on cellular telephone frequencies, whereby the integration device comprises a receiving compartment, a coupler antenna for the cellular telephone network attached to the receiving compartment and electronics combinable with an external antenna. An integration device of this type is only suitable for a certain type of cellular telephone.

SUMMARY OF THE INVENTION

The object of the invention is to propose an integration device which is suitable for connecting different cellular telephones optimally. Furthermore, it is the object of the invention, both to charge different cellular telephones inductively and to connect their cellular network antennae. Finally, it is the object of the invention to propose a method of manufacturing a shell and/or a base for a cradle.

The integration device according to the present invention comprises multiple coupler antennae connected to the electronics, whereby these coupler antennae are suitable for connecting the electronics to at least one antenna of the cellular telephone and whereby one communication link via the cellular telephone network is arranged such that the electronics of the integration device for the active cellular telephone inserted in the receiving compartment, regardless of the type of the cellular telephone inserted and regardless of the position of the cellular telephone inserted in the receiving compartment, selects and uses for the communication that coupler antenna with the highest reception quality in the communication with the cellular telephone located in the receiving compartment. As a result, any cellular telephone with dimensions suitable for accommodation in the receiving compartment can be integrated into a vehicle using one and the same integration device. The core of the invention is the selective use of one coupler antenna of a variety of coupler antennae in order to achieve an optimal connection between the cellular telephone and the integration device, regardless of the type and the position of the cellular telephone. In particular, such an integration device has the advantage that new types of cellular telephones or types of cellular telephones not taken into consideration in the development of the integration device can also be optimally connected since the integration device selects the coupler antenna to be used regardless of the respective situation and hence always achieves the best possible connection result.

The present invention allows the integration device to be fitted with a cradle in which the receiving compartment is formed, whereby the cradle comprises a base and a shell. The base and the shell delimit the receiving compartment, whereby the shell comprises at least two side panels, whereby at least one side panel of the shell and/or the base contains multiple coupler antennae and whereby the receiving compartment is dimensioned such that the base has a surface dimensioned such that this is suitable for storing or attaching cellular telephones of various sizes. With such a design for the periphery of the receiving compartment, the integration device can be developed for a large range of cellular telephone types.

In accordance with the present invention, arranging multiple coupler antennae is allowed for in each of at least two, in particular, adjacent, side panels of the shell. As a result, the probability of having a suitable coupler antenna available for effectively any type of cellular telephone is further increased.

In one version according to the invention, an optimal coupling environment is created, in which multiple coupler antennae are arranged in each of the side panels of a surrounding shell and in which one of the side panels is formed particularly lower than the other side panels, whereby the option of inserting and removing the cellular telephone parallel to the base is created by optionally lowering one of the side panels, as can be an advantage if the cradle is obstructed by a vertical or slanted orientation of the base.

In addition, the present invention allows the integration device to be fitted with at least one charging coil and, in particular, no fewer than two charging coils, whereby the charging coil or the charging coils are integrated into the base of the cradle and whereby a contact surface on the base, where the base and the cellular telephone inserted in the receiving compartment are in contact, forms a charging level. As a result, the energy supply for the cellular telephone inserted is also ensured if this is a suitable for an inductive charge. By arranging the coupler antennae in the shell in accordance with the invention, space for arranging the charging coils is created in the base of the cradle, such that, even where the dimensions of the cradle are comparatively small, there will be space for both the coupler antennae and the charging coil or the charging coils without mutual interference.

In terms of the arrangement of the coupler antennae, the invention allows the coupler antennae to be arranged only in an upper section of the shell located above the charging level and directly adjoining the receiving compartment or the coupler antennae to be arranged only in a lower section of the shell forming an extension of the upper section and running beneath the charging level or for each coupler antenna to extend continuously across an upper section of the shell located above the charging level and directly adjoining the receiving compartment and running across a lower section of the shell forming an extension of the upper section and beneath the charging level or for a first part of each coupler antenna to extend continuously across an upper section of the shell located above the charging level and directly adjoining the receiving compartment, and running across a lower section of the shell forming an extension of the upper section and beneath the charging level and for a second part of the coupler antennae to be arranged only in a lower section of the shell forming an extension of the upper section and running beneath the charging level. As a result, a variety of coupler antennae, each adapted to the design of the cradle, can be arranged in suitable positions for connection.

The invention also allows at least one part of the coupler antennae and, in particular, all coupler antennae, to be arranged at an angle of between 70° and 130° and, in particular, perpendicularly to the charging level. As a result, it is possible for the coupler antennae to extend above and below the charging level.

According to the invention, the receiving compartment or the cradle forming the receiving compartment is integrated into the console of a vehicle such that this forms a tray in which the charging level is located approximately horizontally in the space or the receiving compartment or the cradle forming the receiving compartment is integrated into the console of a vehicle such that this forms a shaft in which the charging level is positioned vertically or at an angle in the space. Thanks to the usability of the integration device according to the invention for both horizontal and vertical installation circumstances, the integration device fulfills the requirements of the automobile industry optimally.

Finally, the present invention allows the coupler antenna to be formed as a planar coupler antenna, arranged either on an interior surface of the shell or inside the shell or on an exterior surface of the shell. By forming the coupler antennae in this fashion, the shell of the cradle itself acts as the support for the coupler antennae and, as a result, the integration device can be manufactured from light and easily recyclable components.

One method for manufacturing a shell or a base for a receiving compartment of a cradle for a cellular telephone, in particular, provided for a cradle for an integration device for a cellular telephone allows the coupler antennae and/or the charging coils to be arranged on the shell and/or on the base of the cradle such that the shell and/or the base is laser-processed for this purpose in the area of the coupler antennae and/or charging coils provided, whereby the shell and/or the base is composed of a synthetic material suitable for a laser structuring process, and a chemical metallization of the processed areas is performed in a subsequent step and finally, the shell and/or the base of the cradle undergoes a surface finishing process. Using such a method, a cradle can be produced in an environmentally friendly fashion, whereby, at the same time, the requirements of a specific design can be easily fulfilled.

The present invention particularly provides for performing laser-processing on the surface of the cradle in contact with the cellular telephone inserted into the cradle. As a result, the coupler antennae and/or charging coils present a minimal clearance to the inserted cellular telephone.

For the purposes of the present invention, a cellular telephone is understood to mean any handheld electronic device equipped with at least one antenna for sending and receiving on cellular telephone frequencies.

For the purposes of the present invention, a charging coil is understood to mean any antenna structure suitable for transferring electric energy to a mobile device by induction.

BRIEF DESCRIPTION OF THE DRAWINGS

Further details of the invention will be described in the drawings by reference to schematically represented embodiments.

DETAILED DESCRIPTION OF THE INVENTION

Figure 1:
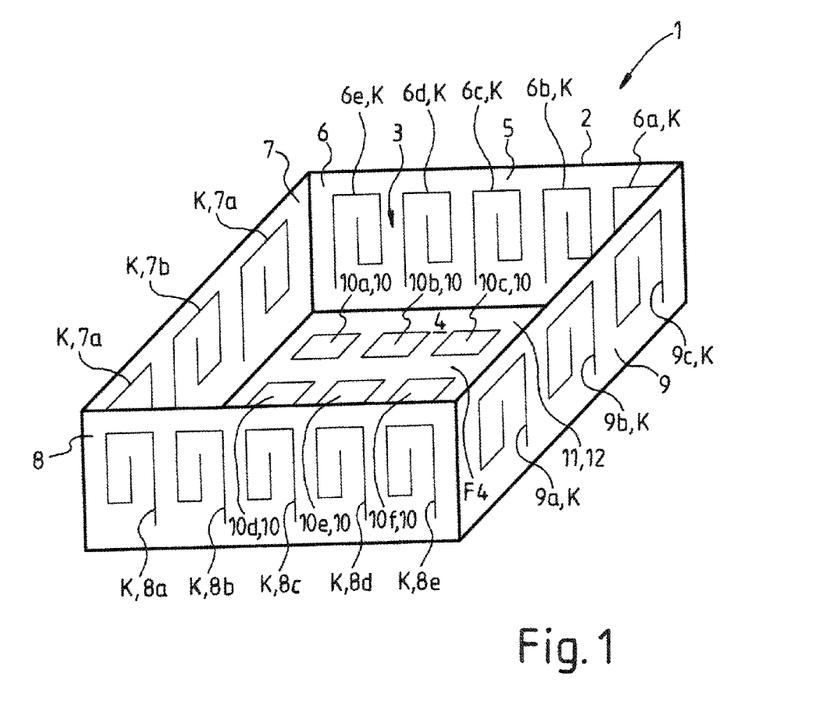
FIG. 1 is a perspective view of a schematically depicted cradle of an integration device according to the invention.

In FIG. 1, a perspective view of a schematic representation of a cradle 2 for an integration device 1 according to the invention is depicted. The integration device 1 includes the cradle 2, which encloses or defines a receiving compartment 3. The receiving compartment 3, provided for seating one of a large number of different types of cellular telephones (not shown) is delimited by a base 4 and a surrounding shell 5. Here, the surrounding shell 5 comprises four side panels 6, 7, 8 and 9. Each of the four side panels 6 to 8 of the shell 5 contains multiple coupler antennae K and 6a to 6e, 7a to 7c, 8a to 8e and 9a to 9c. Each of these coupler antennae is designed as a planar antenna. Twelve charging coils 10 are integrated into the base, of which, however, only six charging coils 10a to 10f in the base 4 are visible in FIG. 1. A contact surface 11 in the base 4 forms a charging level 12, on which preferably the rear side of a cellular telephone can be placed. The base 4 has a surface F4, dimensioned such that this is suitable for storing cellular telephones of various sizes. In accordance with one variant of the example of the realization according to the invention as depicted in FIG. 1, the shell includes the charging coils and the base includes the coupler antennae.

Figure 2:
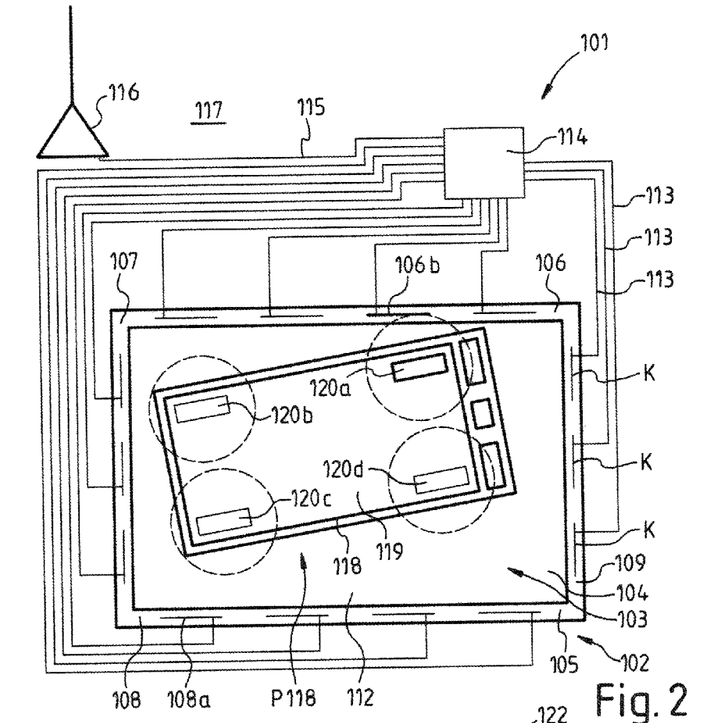
FIG. 2 is a plan view of an integration device according to the invention.

FIG. 2 depicts a plan view of a design variant of an integration device according to the invention 101. For simplification, the charging coils in a base 104 of a cradle 102 of the integration unit 101 have not been depicted. Multiple coupler antennae K are arranged in each side panel 106 to 109 of a surrounding shell 105 defining a receiving compartment 103. The coupler antennae K are connected to the electronics 114 for the integration device 101 via an antenna cable 113, whereby, to maintain clarity, one part of the coupler antennae is labeled "K" and one part of the antenna cable is labelled "113" in FIG. 2. An external antenna 116 of a vehicle 117 is connected to the electronics 114 of the integration device 101 via another antenna cable 115. A cellular telephone 118 is located on a charging level 112 in the receiving compartment 103. The cellular telephone 118 has been placed in a random position P118 with its rear side opposite the display 119 on the base 104 within the receiving compartment 103 defined by the shell 105. In a first variant, the cellular telephone 118 incorporates four antennae 120a to 120d, suitable for sending and receiving on cellular telephone frequencies. In accordance with a second variant, the cellular telephone 118 only incorporates the antenna 120c as a suitable antenna for sending and receiving on cellular telephone frequencies.

In the first variant, the antenna 120a of the cellular telephone 118 is connected to the coupler antenna 106b of the integration device 101, since the antenna 120a is positioned next to one of the coupler antennae K and hence, with this antenna pairing, a good signal strength is obtained.

In the second variant, the connection of the antenna 120c of the cellular telephone 118 with the coupler antenna 108a of the integration device 101 depends, for example, on the quality emitted by the electronics 114.

Figure 3:
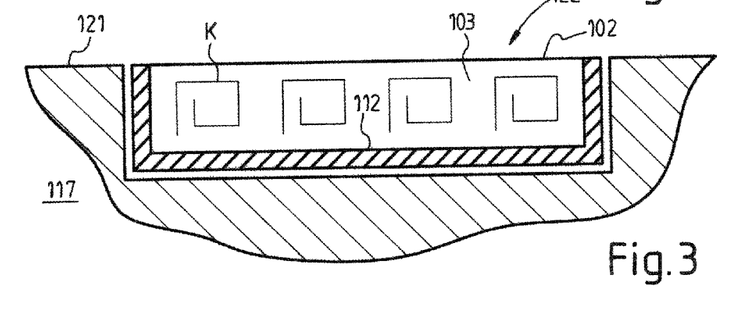
FIG. 3 is a section through a console of a vehicle, into which the cradle of the integration device depicted in FIG. 2 has been inserted.

In FIG. 3, a section through a console 121 of the vehicle 117 is depicted, into which the cradle 102 of the integration device 101 depicted in FIG. 2 has been inserted. The receiving compartment 103 in the installation circumstances depicted has been arranged such that its charging level 112 is positioned horizontally in the space. Hence, the cradle 102 forms a tray 122 for the cellular telephone not depicted here.

Figure 4:
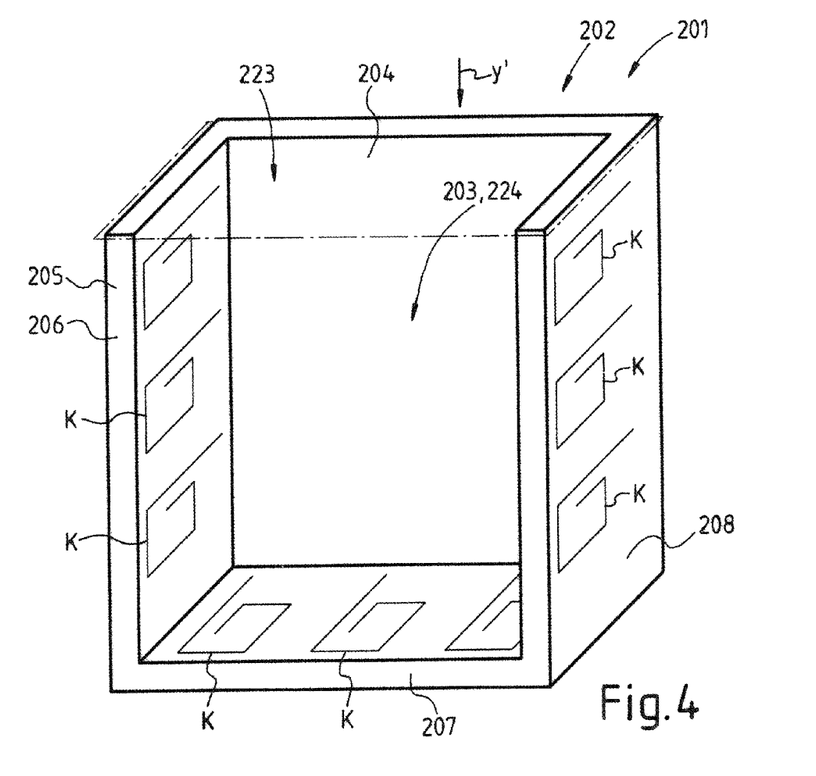
FIG. 4 is a perspective view of a third design variant of a cradle of an integration device according to the invention.

In FIG. 4, a perspective view of a third design variant of a cradle 202 of an integration device 201 according to the invention is depicted. In contrast to the previously depicted design variants, a base 204 for the cradle 202 has been installed vertically in the space, since the cradle 202 has been provided for a vertical installation in a console (not depicted). Also for this reason, a shell 205 comprises only three adjoining side panels 206, 207 and 208. A cellular telephone (not depicted) can be inserted into a receiving compartment 203 in the direction of the arrow y' through an opening 223 created by the omitted fourth side panel if the cradle 202 is integrated in a console of a vehicle, as indicated by the dashed lines. By aligning the base 204 in this manner, the receiving compartment 203 forms a shaft 224 for the cellular telephone. In such installation circumstances, the invention also allows the base 204 to be arranged opposite a cover such that a tubular, accessible through the opening 223, is formed. In FIG. 4, coupler antennae K are indicated schematically. These are arranged on the three side panels 206, 207 and 208, whereby each side panel has three coupler antennae. The coupler antennae for the third design variant, as well as the coupler antennae of the first design variant, are depicted and described as in the second design variant, connected to the electronics of the integration device, which, in turn is connected to an external antenna.

Figure 5:
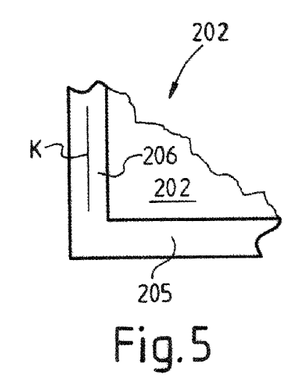
FIGS. 5 to 7 are schematic plan views of a corner section of the cradle depicted in FIG. 4.
Figure 6:
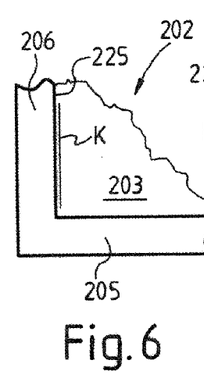
Figure 7:
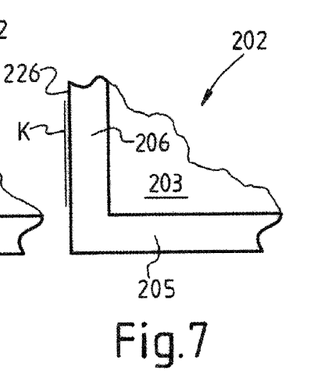

Using schematic plan views of a corner section of the cradle 202 depicted in FIG. 4, in FIGS. 5 to 7, the coupler antenna K is depicted, integrated in the shell 205 or in the side panel 206 in accordance with a first design variant (see FIG. 5). By such an arrangement, the coupler antennae K are particularly well protected from damage. In accordance with a second design variant depicted in FIG. 6, the coupler antenna K is depicted, arranged on an internal surface 225. As a result, the coupler antennae K achieve the maximal proximity to a cellular telephone located in the receiving compartment 203. In accordance with a third design variant depicted in FIG. 7, the coupler antenna K is depicted, arranged on an external surface 226. Using this arrangement, the coupler antennae K are also well protected from environmental influences.

Figure 8:
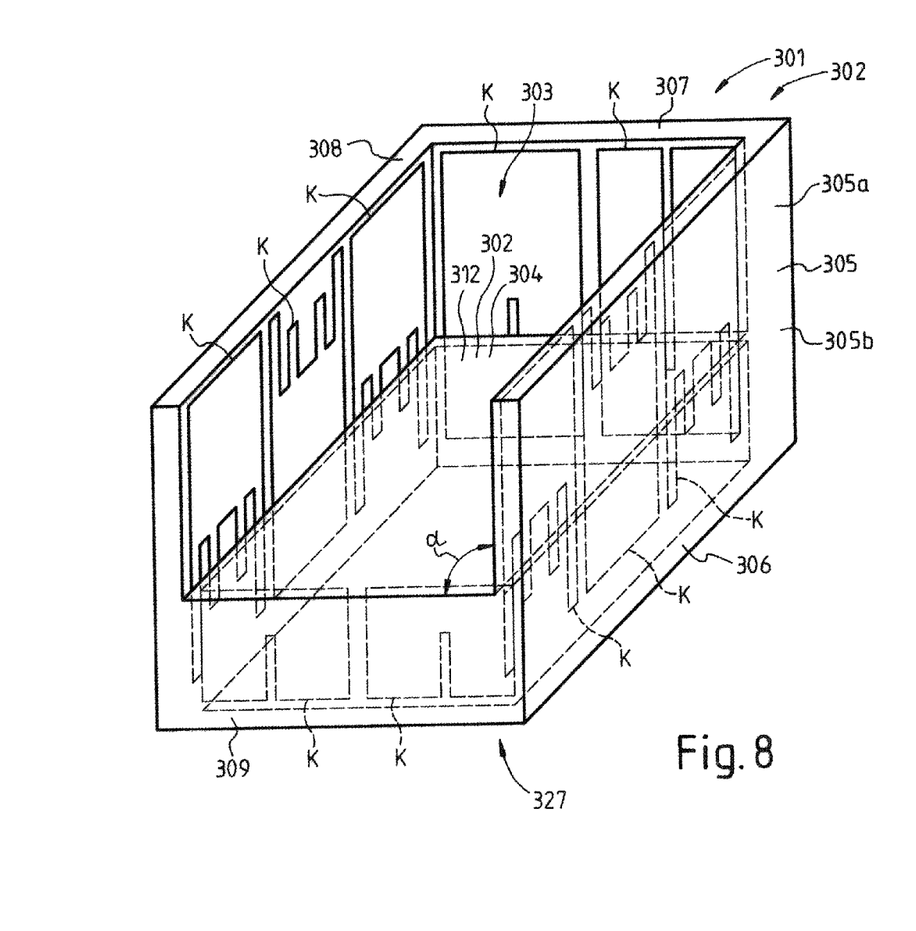
FIG. 8 is a perspective view of a fourth design variant of a cradle of an integration device according to the present invention.
Figure 9:
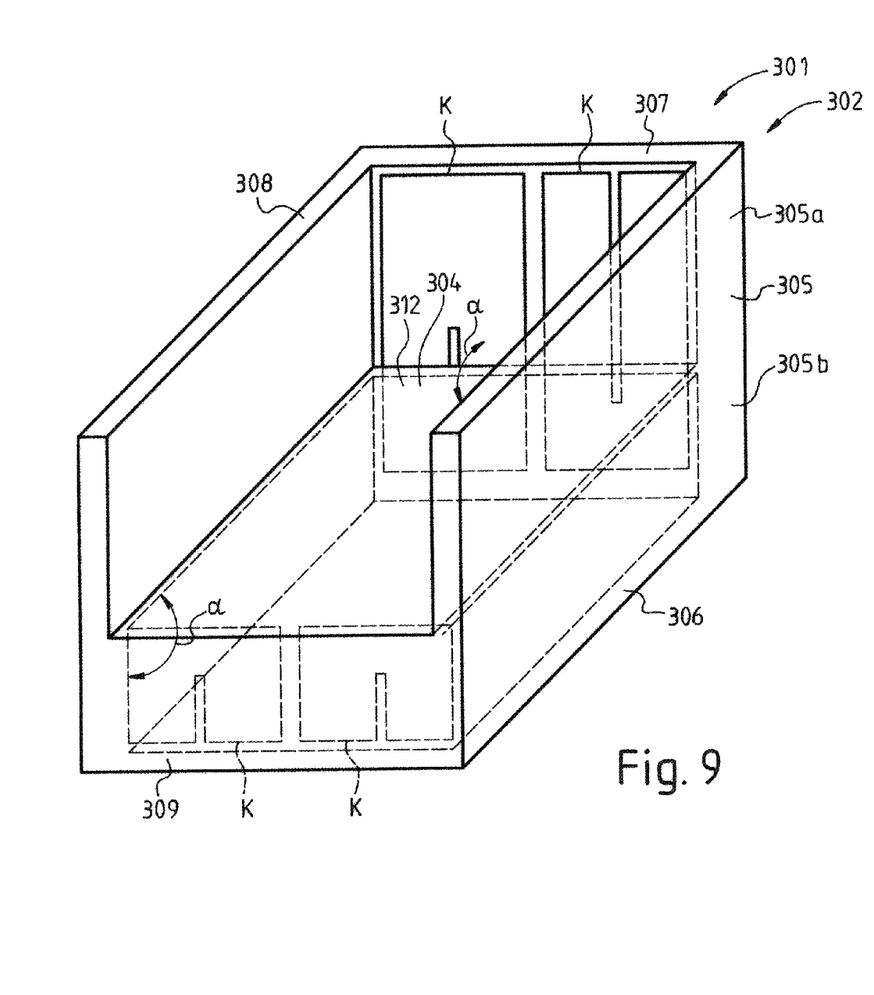
FIGS. 9 and 10 are further representations of FIG. 8 with the coupler antennae partially masked out.
Figure 10:
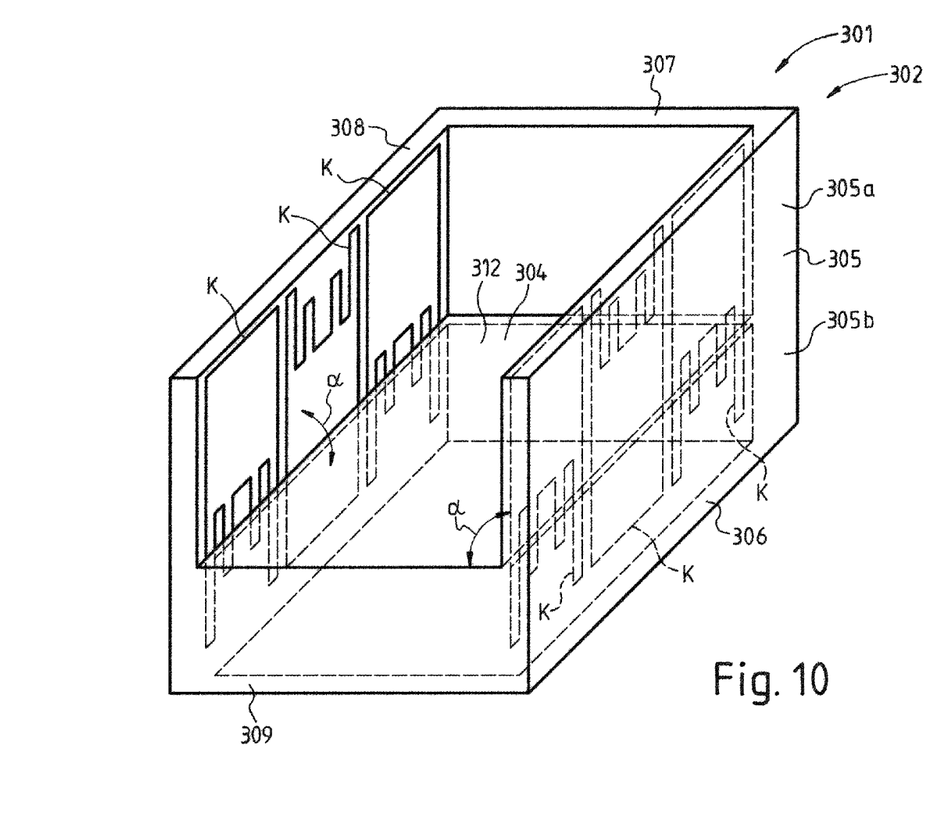

In FIG. 8, a perspective view of a fourth design variant of a cradle 302 of an integration device 301 is depicted. A receiving compartment 303 of the cradle 302 is delimited by a base 304 and a shell 305. The shell 305 comprises four side panels 306 to 309, whereby the side panel 309 is formed lower than the other side panels 306 to 308. Each side panel 306 to 309 incorporates multiple coupler antennae K. In FIG. 8, concealed edges are also depicted by dashed lines. Hence, it can be seen that the coupler antennae K of the side panels 306 to 308 each extend continuously via an upper section 305a of the shell 305 and a lower section 305b of the shell 305. Here, the upper section 305a of the shell 305 is located above a charging level 312 and the lower section 305b of the shell 305 is located beneath a charging level 312. The upper section 305a of the shell 305 is directly adjacent to the receiving compartment 303. In the area of the side panel 309, the shell 305 is designed such that this only has a lower area 305b and its coupler antennae K only extend across this area 305b. Hence, a first part or first component of the coupler antennae K, namely the coupler antennae K of the side panels 306 to 308, extends continuously from an upper section 305a to a lower section 305b of the shell 305. A second part or a second component of the coupler antennae K, namely the coupler antennae K of the side panel 309, only extends over a lower section 305b of the shell 305. The coupler antennae are positioned at an angle α=90° to the base 304 or the charging level 312 respectively. A cavity 327 is formed underneath the base 304, in which the wave emitted from and received by one of the coupler antennae K can propagate via the base 304 from and to the cellular telephone (not depicted) located on the base 304. To facilitate the overview, the cradle 302 depicted in FIG. 8 is depicted again in FIG. 9, whereby the coupler antennae K of the side panels 306 and 308 have been masked out. To facilitate the overview further, the cradle 302 depicted in FIG. 8 is depicted again in FIG. 10, whereby the coupler antennae K of the side panels 307 and 309 have been masked out. It can still be seen in FIG. 8, FIGS. 9 and 10 that the coupler antennae K of one side panel 306 or 307 or 308 or 309 are rotated by 180° relative to one another. As a result, the connection characteristics of the integration device 301 in terms of the cellular telephone connection are further improved, such that the integration device 301, regardless of the position and the type of the cellular telephone inserted, is suitable for establishing a usable connection via one of its coupler antennae K and so a cellular telephone can be operated successfully via the external antenna connected to its electronics.

The invention is not limited to the embodiments depicted or described. Rather, it incorporates further embodiments of the invention within the context of the claims.

LIST OF REFERENCE SYMBOLS

1 Integration device
2 Cradle
3 Receiving compartment
4 Base
5 Shell
6-9 Side panel
6a-6e Coupler antenna
7a-7c Coupler antenna
8a-8e Coupler antenna
9a-9c Coupler antenna
10 Charging coil
10a-10f Charging coil
11 Contact surface
12 Charging level
101 Integration device
102 Cradle
103 Receiving compartment
104 Base
105 Shell
106-109 Side panel
106b Coupler antenna
108a Coupler antenna
112 Charging level
113 Antenna cable between K and 114
114 Electronics
115 Antenna cable between 115 and 116
116 External antenna
117 Vehicle
118 Cellular telephone
119 Display for 118
120a-120d Antenna for 118
121 Console for 117
122 Tray for 118
201 Integration device
202 Cradle
203 Receiving compartment
204 Base
205 Shell
206-208 Side panel
223 Opening for 202
224 Shaft 225 Internal surface of 205 or 206
226 External surface of 205 or 206
301 301 Integration device
302 302 Cradle
303 303 Receiving compartment
304 Base 304
305 Shell 305
305a Upper section 305a
305b Lower section 305b
306-309 Side panels 306 to 309
312 Charging level 312
327 Cavity 327
α Angle between K and 312
y' Direction of arrow y'
F4 Surface of 4
K Coupler antennae K
P118 Position P118

We claim:

1. An integration device for incorporating a cellular telephone in a vehicle,
    whereby the integration device comprises a receiving compartment, a coupler antenna for mobile communications attached to the receiving compartment, electronics which can be attached to an external antenna,
    wherein the integration device incorporates multiple coupler antennae connected to the electronics,
    whereby these coupler antennae are suitable for connecting to the electronics via at least one antenna of the cellular telephone,
    whereby a communications connection is made via the cellular telephone network such that the electronics of the integration device for the active cellular telephone inserted in the receiving compartment, regardless of the type of the cellular telephone inserted and regardless of the position of the cellular telephone inserted in the receiving compartment, selects and uses for the communication that coupler antenna with the highest reception quality in the communication with the cellular telephone located in the receiving compartment.

2. The integration device in accordance with claim 1, wherein the integration device comprises a cradle, in which the receiving compartment is formed, whereby the cradle comprises a base and a shell, which delimit the receiving compartment, whereby the shell comprises at least two side panels, whereby at least one side panel of the shell and/or the base incorporates multiple coupler antennae and whereby the receiving compartment is dimensioned such that the base has a surface, which is dimensioned such that this is suitable for storing or attaching cellular telephones of various sizes.

3. The integration device in accordance with claim 2, wherein multiple coupler antennae are arranged in each of at least two, in particular, adjacent side panels of the shell.

4. The integration device in accordance with claim 2, wherein multiple coupler antennae are arranged in each of all the side panels of a surrounding shell, whereby one of the side panels is formed particularly lower than the other side panels.

5. The integration device in accordance with claim 1, wherein the integration device incorporates at least one charging coil and, in particular, at least two charging coils, whereby the charging coil or the charging coils are integrated in the base of the cradle and whereby a contact surface of the base, with which the base is in contact with the cellular telephone inserted in the receiving compartment, forms a charging level.

6. The integration device in accordance with claim 1, wherein the coupler antennae are arranged only in an upper section of the shell, which is positioned above the charging level and is directly adjacent to the receiving compartment or wherein the coupler antennae are arranged only in a lower section of the shell, which forms an extension of the upper section and which runs beneath the charging level or wherein each coupler antenna extends continuously via an upper section of the shell located above the charging level and directly adjacent to the receiving compartment, and via a lower section of the shell forming an extension of the upper section and running beneath the charging level or wherein a first part of each coupler antenna extends continuously via an upper section of the shell located above the charging level and directly adjacent to the receiving compartment and via a lower section of the shell, forming an extension of the upper section and running beneath the charging level, and that a second part of the coupler antennae is arranged only in a lower section of the shell forming an extension of the upper section and running beneath the charging level.

7. The integration device in accordance with claim 1, wherein at least one part of the coupler antennae, and, in particular, all coupler antennae, is at an angle of between 70° and 130° and, in particular, perpendicular to the charging level.

8. The integration device in accordance with claim 1, wherein the receiving compartment or the cradle forming the receiving compartment is integrated in a console of a vehicle such that this forms a tray, in which the charging level is positioned approximately horizontally in the space or such that the receiving compartment or the cradle forming the receiving compartment is integrated in a console of a vehicle such that this forms a shaft in which the charging level is positioned vertically or at an angle in the space.

9. The integration device in accordance with claim 1, wherein the coupler antenna is formed as a planar coupler antenna, arranged either on an internal surface of the shell or inside the shell or on an external surface of the shell.

10. A method of manufacturing a shell and/or a base of a receiving compartment of a cradle for a cellular telephone, in particular, a cradle for an integration device for a cellular telephone in accordance with claim 1, wherein said coupler antennae and/or charging coils are attached to the shell and/or to the base of the cradle such that the shell and/or the base for this is laser-processed in the area of the coupler antennae provided and/or in the area of the charging coils provided, whereby the shell and/or the base is composed of a synthetic material suitable for a laser structuring process, and a chemical metallization of the processed areas is performed in a subsequent step and finally, the shell and/or the base of the cradle undergoes a surface finishing process, in particular, by flocking.

* * * * *